Patented Aug. 12, 1947

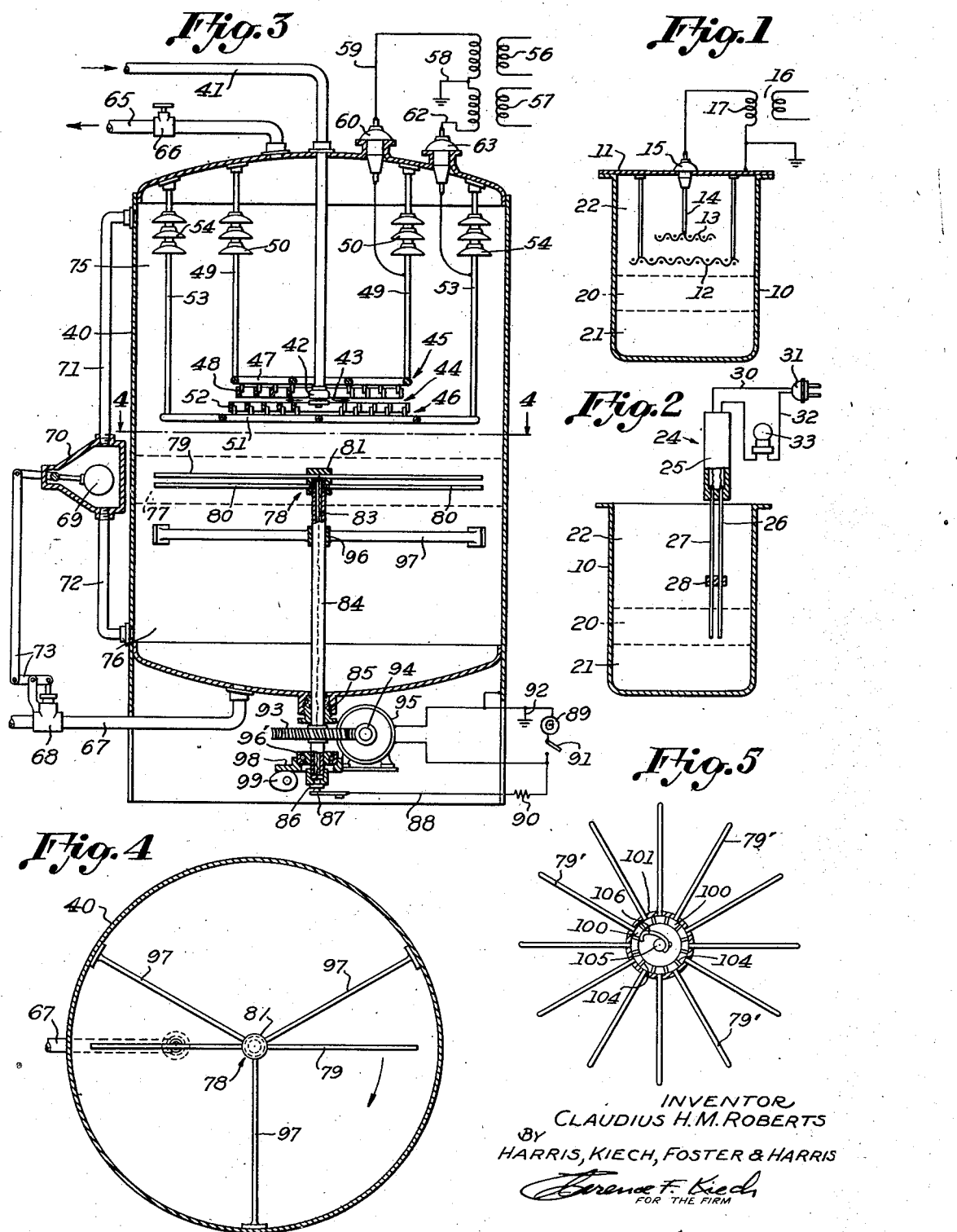

2,425,355

UNITED STATES PATENT OFFICE 2,425,355

ELECTRICAL APPARATUS FOR SEPARATING THE CONSTITUENTS OF AN OIL-WATER SYSTEM

Claudius H. M. Roberts, Palos Verdes Estates, Calif., assignor to Petrolite Corporation, Ltd., Wilmington, Del., a corporation of Delaware Application August 2, 1940, Serial No. 350,013

14 Claims. (Cl. 204—304)

My invention relates to separating the constituents of an oil-water system and to the resolution of emulsions and, more particularly, to a novel process and apparatus for resolving or preventing sludge accumulations in a separation zone in which the constituents of a mixture or emulsion are undergoing settling or are otherwise being separated by taking advantage of the difference in specific gravity between two liquids. In the preferred embodiment, the invention contemplates the use of an electric field, usually accompanied by mild agitation within the field, for resolving sludge.

When two immiscible liquids, such as oil and water, are intimately mixed in the presence of an emulsifying agent, the resulting emulsion may be such that complete separation into bodies of the two liquids cannot readily be obtained by settling or centrifuging. The mixing action may have been sufficiently intense to excessively emulsify the constituents. Various expedients have been used for aiding in the resolution of the emulsion, such, for example, as the use of chemicals, heat and pressure, subjection of the emulsion to a high-intensity electric field, centrifuging, etc.

When emulsions are separated by utilization of the difference in specific gravity of the constituents, it is usually found that a clean separation between the component-phase liquids is not readily obtained. This is often true irrespective of whether such separation follows the application of some emulsion-treating expedient. For instance, it is often found that a layer of sludge accumulates in a sludge zone between relatively completely separated bodies of the component phase-liquids. By way of example, if water is mixed with oil by suitable agitation and the emulsion is subjected to a gravitational separating action, there will result superimposed bodies of oil and water which has separated therefrom, but between these bodies will be found a layer of sludge which separates with difficulty, if at all.

Such sludges are sometimes produced in the electric dehydration of crude oil emulsions where the treated emulsion constituents are subjected to a gravitational separating action. Such an electric dehydration process has for its purpose a reduction in the amount of water in the emulsion to produce a marketable oil, and it is very desirable that sludge accumulations within the treater should be minimized, otherwise they represent a distinct loss in oil and, if permitted to accumulate, may build up to short-circuit the electric field.

More recently, the electric process has come into general use in the purification of oils containing very little or no water, to remove various impurities which, upon heating in subsequent refinery equipment, may cause corrosion or deposition, or which may deleteriously affect the refinery products. In this process, a relatively fresh water is mixed with the oil and the resulting dispersion is subjected to the action of an electric field, after which it is subjected to gravitational separation. The minimizing of sludge and the prevention of sludge accumulations in the electric treater are quite necessary in such a process, particularly as such a purifying process is conventionally operated on-stream with regard to the refining equipment and because increasing sludge accumulations represent not only an economic waste of oil but interfere seriously with the continuity of operation of the process. Such an electric purification process is exemplified in the patent to Harold C. Eddy, No. 2,182,145.

The oil-water sludges with which this invention is primarily concerned are those which tend to accumulate in a sludge zone during separation of treated or untreated component phase-liquids. In general, the sludge comprises incompletely resolved emulsion and while, in some instances, it may tend to separate into its constituents when permitted to stand for prolonged periods of time, this does not take place with the rapidity required in commerce. The sludge is essentially of the water-in-oil type in that the dispersed phase is formed of water and the external or continuous phase is formed of oil or oily material. The percentage of water present is much higher than in the water-in-oil emulsion commonly subjected to electric treatment, thus making the sludge much more conducting and incapable of direct treatment in the high-gradient high-voltage fields usually employed for electric dehydration or electric purification.

The sludge may be of such nature as to be stabilized by irreversibly adsorbed material which is either in solid form initially or which solidifies after adsorption. It may consist of or include fine-grained sludge tending to cluster or clot if permitted to accumulate in a relatively quiescent sludge zone. Such clustering may be reversible or irreversible. Mild agitation of the reversibly clustered sludge may cause the subdivision of the clusters into the individual emulsion droplets but if the sludge is irreversibly clustered, this will tend only to subdivide the clusters into smaller but still clustered droplets or masses. The present invention can very advantageously be employed on irreversible or clustered sludges to effect resolution thereof.

It is an object of the present invention to provide a novel process and apparatus for resolving sludge, which tends to collect in a sludge zone between superimposed bodies comprising oil and water, by subjecting different portions of the sludge to an electric field, the time of application of the field to any particular portion of the sludge being insufficient to develop and maintain short-circuiting currents across the field.

It is another object of the invention to establish an electric field in a sludge zone, which field is of relatively low voltage gradient.

A further object of the invention is to establish a mild turbulence in the sludge undergoing electric treatment to prevent short-circuiting of the electrodes.

A further object of the invention is to establish an electric field between electrodes and to induce a relative motion between the sludge and the electrodes and, in one embodiment, to move the electrodes through the sludge to establish the desired degree of turbulence.

Another object of the invention is to establish a sludge-resolving field by use of two electrodes spaced only a short distance from each other, and by use of relatively low potentials.

Further objects and advantages of the invention will be evident hereinafter.

Referring to the drawing:

Figure 1 is a vertical sectional view of a small electric treater in which a sludge layer has been produced;

Figure 2 is a view of the treater shown in Figure 1 with the electrodes removed and with the sludge-resolving means inserted;

Figure 3 is a vertical sectional view of a commercial electric treater equipped with one embodiment of the invention;

Figure 4 is a horizontal sectional view taken on the line 4—4 of Figure 3; and

Figure 5 is a view taken similar to Figure 4 with some of the parts shown in section to illustrate an alternative embodiment of the invention.

Referring particularly to Figure 1, the small electric treater shown therein includes a receptacle 10 closed by a removable cover 11 and adapted to receive a body of emulsion of the water-in-oil type. Electrode means is used to establish a coalescing electric field within the emulsion, this electrode being shown as including a grounded interstitial electrode 12 and a live interstitial electrode 13. The electrode 12 is suspended from and grounded to the cover 11, while the electrode 13 is suspended therefrom by a rod 14 extending through an insulator 15. A high-voltage transformer 16 provides a secondary winding 17, one terminal of which is grounded and the other of which is connected to the electrode 13. A field is thus established within the receptacle 10 of sufficient intensity to coalesce the dispersed water droplets.

Some emulsions thus electrically treated will resolve substantially completely into bodies of oil and water. The electrically-treated constituents of other emulsions tend to produce a layer of sludge. In Figure 1, this sludge is indicated approximately as occupying a sludge zone 20 between a body of separated water 21 and a body of oil 22. Similar superimposed layers are produced if other emulsion-resolving expedients are used or if a relatively loose emulsion is subjected to gravitational action without previous treatment. The sludge in the sludge zone may be of such character that it will eventually resolve almost completely into oil and water if permitted to stand for prolonged periods of time, or it may be of such character as to resist such resolution almost indefinitely. The present invention provides a method and apparatus for quickly resolving this sludge.

Referring particularly to Figure 2, showing one embodiment of the invention, the cover 11 and the electrodes 12 and 13 have been removed from the receptacle 10, leaving the bodies of water and oil 21 and 22 and the sludge in the sludge zone 20 therebetween. I have found it possible to resolve this sludge very quickly by impressing a low gradient electric field thereon, usually accompanied by gentle agitation. For example, I may lower into the receptacle 10 an electrode unit 24 consisting of a head comprising a handle 25 formed of insulating material and from which rods 26 and 27 depend. These rods are suitably spaced from each other by their mode of connection to the handle 25, supplemented, if desired, by use of a block of insulating material 28 through which the rods extend.

In the circuit shown in Figure 2, the rod 27 is connected by a conductor 30 to a plug 31 which can be inserted in a conventional convenience outlet, being thus connected to a source of alternating potential of relatively low voltage, such as 110 or 220 volts. The other side of the alternating current source is connected by conductor 32 to the rod 26, and a suitable impedance is preferably connected in the conductor 32 to limit the current to the rod electrodes 26 and 27. This current-limiting means is shown as an incandescent electric light bulb 33 serving both to limit the current and to indicate (by the glowing of the filament) if and when the rod electrodes are short-circuited. For example, if the electrode unit is lowered too far in the receptacle 10 so that the rod electrodes 26 and 27 are short-circuited by the body of water 21, the incandescent bulb will glow and at the same time will limit the current flowing to the electrode unit.

I have found that relatively low voltage gradients between the rod electrodes 26 and 27 will resolve the sludge in the sludge zone 20. By way of example, average gradients between the electrodes of from about 400 to somewhat more than 800 volts per inch can usually be used with good success, though sometimes average gradients as low as 200 volts per inch can be used, as can gradients below 1000 volts per inch. These gradients never should be in excess of 1500 volts per inch, and usually not in excess of 1000-1200 volts per inch. In one system which has proved very satisfactory the rod electrodes 26 and 27 consist of two brass rods, each of a diameter of $\frac{1}{16}$", these rods being spaced about $\frac{1}{8}$" apart and connected in series with a 10-watt incandescent bulb, the unit being connected to a source of 110 volt alternating current. This limits the short-circuiting current to approximately 100 milliamperes and produces a voltage gradient of about 880 volts per inch. It will be understood that various other impedances can be employed. Experiments with impedances of lower resistance, for example a 100-watt ballast resistor, which limits flow to approximately one ampere, indicate no substantial improvement in operation. It is desirable, particularly for resolving sludges for test purposes, to avoid electrolytic changes in the aqueous phase, and for this reason I prefer to use for test purposes as low a voltage as possible. For plant scale operation, in which minor electrolysis has no disadvantage, voltage gradients somewhat higher can be employed, for example up to 1000 or 1500 volts per inch.

Referring again to Figure 2, it is found that the sludge in the sludge zone 20 can be quickly resolved by lowering the electrode unit 24 to such position that the lower ends of the rod electrodes 26 and 27 are disposed in the sludge zone, and moving the unit about. It has been found that sweeping the electrodes once or twice around or through the sludge zone 20 will suffice to resolve the sludge. During this movement, the electrodes should not be short-circuited by the body of water 21 and, if this occurs, as will be indicated by the glowing of the incandescent bulb 33, the electrode unit 24 should be raised to the position shown. The mild agitation created by movement of the rod electrodes 26 and 27 through the sludge zone assists in the resolution of the sludge and at the same time prevents prolonged short-circuiting of the fields between the electrodes by the water component of the sludge. There may be periodic short-circuits formed across the field during such movement of the rod electrodes but these persist only for an instant in view of the relative movement between the electrodes and the sludge.

In Figure 3, I have shown a commercial treater incorporating another embodiment of the invention. This treater includes a receptacle 40 of the pressure type and to which an emulsion (either naturally-occurring or artificially-formed) is continuously delivered through a pipe 41. An emulsion distributor 42 forms this emulsion into an outward-moving stream or sheet discharging as indicated by arrows 43.

The emulsion thus discharged enters a treating space 44 formed between an upper electrode 45 and a lower electrode 46. The upper electrode is shown as consisting of a support 47 from which depend concentric rings 48, the unit being supported by rods 49 and insulators 50. Similarly, the lower electrode 46 includes a support 51 carrying upward-extending concentric rings 52, preferably disposed at a position below the spaces between the concentric rings 48. The support 51 extends outward sufficiently to be retained by rods 53 suspended from insulators 54. Any electric field established in the treating space 44 will be concentrated adjacent the edges of the concentric rings 48 and 52.

To energize the electrodes 45 and 46, I prefer to use additively connected transformers 56 and 57. One terminal of each of the secondary windings is grounded as indicated by the numeral 58 and is thus connected to the receptacle 40. The other terminal of the secondary winding of the transformer 56 is connected by a conductor 59 extending through a bushing 60 to the upper electrode 45. The remaining secondary winding of the transformer 57 is connected by a conductor 62 extending through a bushing 63 to the lower electrode 46. Correspondingly, the voltage between the electrodes 45 and 46 will be equal to the sum of the voltages of the transformers 56 and 57, while the voltage between either electrode and any grounded portion of the equipment will be one-half of this maximum voltage if the transformers are of equal potential.

With such a treater, the emulsion continuously delivered thereto through the pipe 41 will be electrically treated and the constituents will tend to gravitationally separate in the receptacle 40. The oil will be continuously withdrawn through a pipe 65 equipped with a back-pressure valve 66 to maintain a superatmospheric pressure in the treater, while water will be withdrawn through a pipe 67 equipped with a valve 68, preferably operated automatically to maintain the total amount of water in the receptacle 40 substantially constant and thus control automatically the surface of the body of water therein. The control of the valve 68 may be effected by any suitable means, exemplified by a float 69 disposed in a chamber 70 forming a part of a side pocket including an upward-extending pipe 71 communicating with the oil at the top of the receptacle 40 and a downward-extending pipe 72 communicating with the water at the bottom of the receptacle 40. A relatively clean oil-water interface is thus established in the chamber 70, thus causing the float 69 to rise and fall with changes in position of this interface. The float 69 is connected to the valve 68 by well known linkage, indicated by the numeral 73, and adapted to open the valve 68 to a greater degree when the interface rises and to move the valve toward closed position when the interface drops.

The electrically-treated constituents are shown as separating into superimposed bodies, the upper comprising oil and being indicated by the numeral 75, and the lower comprising water and being indicated by the numeral 76. Between these bodies is a sludge zone 77. With certain emulsions, sludge will tend to accumulate in this zone and build up at the particular throughput employed. It is quite essential to prevent this sludge from building up to such an extent that it will short-circuit the electrodes, yet in some instances the throughput rate is such with respect to the expedients used for treatment of the emulsion that this will take place in the absence of appropriate sludge treatment.

To resolve the sludge or to prevent its continued formation, the embodiment of Figure 3 provides a rotary electrode unit 78 composed essentially of upper and lower rod electrodes 79 and 80 mounted in a head 81 formed of insulating material. The rod electrodes 79 may be continuous through the head 81 and connected to a conductor 83 extending downward in a rotatable pipe 84 which extends through a stuffing box 85, the lower end of this conductor being connected to a contact 86. A brush 87 bears against the contact 86 and is connected through a conductor 88 with a source of alternating potential indicated by the numeral 89, a current-limiting impedance 90 being in series circuit. A switch 91 may be closed when it is desired to energize the electrode unit 78. The other terminal of the source of alternating potential 89 is grounded as indicated at 92 and is also connected to the receptacle 40. The lower rod electrodes 80 are likewise grounded and this can easily be accomplished by threading the inner ends thereof into corresponding threaded openings of the rotating pipe 84.

The pipe 84 is rotated slowly by any suitable means, shown as comprising a worm gear 93 secured thereto outside the receptacle 40 and meshing with a worm 94. This worm 94 is driven by an electric motor 95 connected in parallel across the source 89 and the switch 91. A bearing 96 within the receptacle serves to journal the pipe 84 and is supported by rods 97 suitably secured to this receptacle. A thrust bearing 96' may be used to support the pipe 84 and is preferably made vertically-adjustable as by means diagrammatically indicated, including a bearing mount 98 bearing against a cam 99 which can be turned to change the vertical position of the pipe 84 and thus adjust the position of the electrodes in the sludge zone.

When the switch 91 is closed, an electric field of relatively low voltage gradient is established between the rod electrodes 79 and 80. At the same time, the motor 95 turns the electrode unit slowly to set up appropriate agitation which is not only helpful in resolving the sludge but in preventing prolonged short-circuiting of the field between the rod electrodes by the water component of the sludge. The rod electrodes 79 and 80 preferably rotate in a substantially horizontal plane within the sludge zone 77. Various other means can be used for moving a live electrode within this sludge zone without departing from the spirit of the invention.

The invention contemplates subjecting different portions of the sludge in the sludge zone to an electric field. The sludge undergoing treatment in the field should preferably be subjected to agitation sufficient to prevent prolonged short-circuiting of the field by the water component of the sludge. In subjecting different portions of the sludge to an electric field, it is contemplated that this may be accomplished by effecting a relative movement between the field and the sludge (for example, by rotating the electrode through the sludge as contemplated in Figure 3 or by temporarily establishing electric fields in different portions of the sludge, as exemplified, for example, in the embodiment of Figure 5).

Referring particularly to Figure 5, the electrode unit therein-shown comprises a plurality of upper rod electrodes 79', below each of which is positioned a lower rod electrode corresponding to the electrode 80 of Figure 3, the lower electrodes being grounded by means such as shown in Figure 3. Each of the rod electrodes 79' is connected to a contact member or armature segment 100. A housing 101 formed of insulating material provides slotted openings for receiving the rod electrodes 79', and the armature segments are of such shape and size as to occupy substantially the entire space just inside the housing 101, being separated by short strips of insulating material 104 so as to be insulated from each other. In this instance, the housing 101 and the rod electrodes 79' are stationary and the worm gear 93 (Figure 3) is connected to a rod 105 which turns and carries a brush 106 making contact successively with the segments 100, thus successively energizing the rod electrodes 79'. In this way, electric fields are established in different portions of the sludge. The individual portions of the sludge are subjected to the action of the electric field only for a sufficient time to aid in the resolution thereof and not long enough to maintain a short-circuiting current across the field. In this embodiment of the invention, the desired relative motion of the fluid and the electrodes may be secured by the normal slow internal convection currents in the treater, thereby bringing additional sludge into the region of the electrodes in the intervals between application of the electricity.

In the embodiment shown in Figures 3 and 5, the voltage used in energizing the sludge-resolving electrodes will be materially lower than that used for energizing the electrodes 45 and 46. Relatively low potentials can be used, for example 110 or 220 volts, if the electrodes are relatively closely spaced. Likewise, the voltage gradients in the sludge-resolving field are considerably lower than those used in the treating space 44 where gradients considerably higher than 2000 volts per inch are desirable, sometimes from 7000–9000 volts per inch. In the sludge-resolving field, satisfactory resolution can be obtained by using gradients of several hundred volts per inch, but gradients above about 1200–1500 volts per inch are not desirable because of the low resistivities of most sludges and their inability to withstand higher voltage gradients without short-circuiting. In addition, the potentials used in the sludge treatment of the invention are relatively low. Conventional electric dehydrators use transformers of not less than 11,500 volts and, in the great majority of cases, especially in the electric purification process, applied voltages of 33,000 to 66,000 volts are used. It will at once be apparent, then, that treatment of sludge as contemplated in the present invention differs radically from treatment of conventional emulsions supplied to electric treaters used for dehydration or purification.

Various changes can be made without departing from the spirit of the invention as defined in the appended claims.

I claim as my invention:

1. In combination with a receptacle containing superimposed bodies of liquids comprising respectively oil and water which has separated from the oil, a device for resolving sludge in a sludge zone maintained in a substantially fixed position just above the separated water, which device includes: a pair of elongated electrodes extending in said sludge zone and spaced from each other; means for insulating one of said electrodes from the other and for retaining said electrodes side by side in spaced relation; means for impressing a potential difference between said electrodes whereby an electric field is established therebetween of such intensity as to resolve the sludge; and means for moving said electrodes in said sludge zone as a unit to bring different portions of said sludge into the electric field between said electrodes.

2. In an electric treater for emulsions, the combination of: a receptacle; a pair of spaced electrodes defining a treating space in said receptacle; means for establishing a high-voltage-gradient coalescing electric field in said treating space; means for delivering an emulsion of the water-in-oil type to said treating space, said electric field coalescing the dispersed water of said emulsion to produce treated constituents gravitationally separable in said receptacle to produce superimposed bodies of oil-continuous and water-continuous material; means for maintaining the upper surface of said body of water-continuous material at a substantially fixed level substantially below the lower of said electrodes to define a sludge zone just above said level, the electrical treatment of said emulsion in said treating space being of such character that separation of said treated constituents tends to produce sludge in said sludge zone just above said body of water-continuous material; a pair of horizontal rods disposed in said sludge zone at a position below said pair of spaced electrodes; means for insulating said rods from each other and for establishing a sludge-resolving electric field therebetween, said sludge-resolving electric field having a gradient of several hundred volts per inch but less than about 1500 volts per inch; and means for moving said horizontal rods exclusively within said sludge zone.

3. In an electric treater for emulsions, the combination of: a receptacle; a pair of spaced electrodes defining a treating space in said receptacle; means for establishing a high-voltage-gradient coalescing electric field in said treating space; means for delivering an emulsion of the water-in-oil type to said treating space, said electric field coalescing the dispersed water of said emulsion to produce treated constituents gravitationally separable in said receptacle to produce superimposed bodies of oil-continuous and water-continuous material; means for maintaining the upper surface of said body of water-continuous material at a substantially fixed level substantially below the lower of said electrodes to define a sludge zone just above said level, the electrical treatment of said emulsion in said treating space being of such character that separation of said treated constituents tends to produce sludge in said sludge zone just above said body of water-continuous material; a rotatable head disposed below said pair of spaced electrodes; a pair of spaced rod electrodes extending outwardly in said sludge zone from said head in side-by-side relationship; means for establishing a potential difference between said rod electrodes to establish a sludge-resolving field therebetween having a gradient of several hundred volts per inch but less than about 1500 volts per inch; and means for rotating said head to sweep said spaced rod electrodes through the sludge in said sludge zone.

4. In combination with a receptacle containing superimposed bodies of liquids comprising an upper body of oil-continuous material, a lower body of water which has separated from the oil, and an intermediate layer of sludge in a sludge zone maintained in a substantially fixed position just above the body of separated water, a device for resolving sludge in said sludge zone, which device includes: two rod electrodes; means for mounting said rod electrodes to extend substantially horizontally in said sludge zone in substantially parallel and vertically spaced relationship, said means including a head and means for journalling said head to rotate about a vertical axis; means for insulating one of said rod electrodes from the other; means for impressing a potential difference between said rod electrodes for establishing an electric field between said rod electrodes of sufficient intensity to resolve the sludge in said sludge zone; and means for slowly rotating said head about said vertical axis to sweep said vertically-spaced rod electrodes through said sludge zone during the time that said electric field is established between said electrodes to resolve said sludge and establish a gentle agitation in the sludge zone due to sweeping of said rod electrodes through said zone.

5. In combination with a receptacle containing superimposed bodies of liquids comprising respectively oil and water which has separated from the oil, a device for resolving sludge in a sludge zone maintained in a substantially fixed position just above the separated water, which device includes: a head; a pair of spaced rod electrodes extending side by side from said head, said head including electric insulator means for insulating said rod electrodes from each other; means for impressing a sludge-resolving potential between said electrodes, said rod electrodes extending substantially horizontally in said sludge zone; means for rotatably mounting said head to turn about a vertical axis within said receptacle; and means to rotate said head to move said rod electrodes substantially horizontally in said sludge zone.

6. In an electric treater for emulsions, the combination of: a grounded receptacle; a pair of spaced electrodes defining a treating space in said receptacle; means for establishing a high-voltage-gradient coalescing electric field in said treating space; means for delivering an emulsion of the water-in-oil type to said treating space, said electric field coalescing the dispersed water of said emulsion to produce treated constituents gravitationally separable in said receptacle to produce superimposed bodies of oil-continuous and water-continuous material; means for maintaining the upper surface of said body of water-continuous material at a substantially fixed level substantially below the lower of said electrodes to define a sludge zone just above said level, the electrical treatment of said emulsion in said treating space being of such character that separation of said treated constituents tends to produce sludge in said sludge zone just above said body of water-continuous material; an electrode means comprising another electrode disposed exclusively in said sludge zone and at a position below said pair of spaced electrodes; means for insulating said other electrode from said receptacle and for impressing thereon a potential which is above ground potential whereby an electric field is established in said sludge zone adjacent said electrode, said potential being only sufficient to establish adjacent said electrode a sludge-resolving gradient of a few hundred volts per inch but less than about 1500 volts per inch; and means for moving said other electrode through said sludge in a locus of motion exclusively within said sludge zone.

7. In combination with a grounded receptacle containing superimposed bodies of liquids comprising an upper body of oil-continuous material and a lower body of water which has separated from the oil-continuous material, a device for resolving sludge in a sludge zone maintained in a substantially fixed position just above the separated body of water, which device includes: an electrode means comprising an electrode disposed in said sludge zone; means for insulating said electrode from said receptacle and for impressing thereon a potential above ground potential which is sufficient to produce a sludge-resolving electric field in said sludge zone adjacent said electrode; and means for moving said electrode in said sludge zone to subject different portions of said sludge to treatment by said sludge-resolving field.

8. In combination with a grounded receptacle containing superimposed bodies of liquids comprising an upper body of oil-continuous material and a lower body of water which has separated from the oil-continuous material, a device for resolving sludge in a sludge zone maintained in a substantially fixed position just above the separated body of water, which device includes: means for producing a localized sludge-resolving field in said sludge zone, said means including an electrode means comprising an electrode disposed in said sludge zone, and means for insulating said electrode from said receptacle and for impressing thereon a potential above ground potential which is sufficient to produce a sludge-resolving electric field in said sludge zone adjacent said electrode; and means for moving said sludge-resolving field in said sludge zone to subject different portions of said sludge to treatment by said sludge-resolving field.

9. In combination with a grounded receptacle containing superimposed bodies of liquids comprising an upper body of oil-continuous material and a lower body of water which has separated from the oil-continuous material, a device for resolving sludge in a sludge zone maintained in a substantially fixed position just above the separated body of water, which device includes: an electrode means comprising an electrode disposed in said sludge zone and extending substantially horizontally and radially from the center of said receptacle; means for insulating said other electrode from said receptacle and for impressing thereon a potential above ground potential which is sufficient to produce a sludge-resolving electric field in said sludge zone adjacent said electrode; and means for rotating said electrode in said sludge zone about a vertical axis at the center of said receptacle to subject different portions of said sludge to treatment by said sludge-resolving field.

10. In combination: a grounded receptacle adapted to contain superimposed bodies comprising respectively a body of oil-continuous material and a body of water which has separated from the oil-continuous material, there being a sludge zone just above the separated body of water; means for withdrawing water from said body of water to maintain said sludge zone in substantially fixed position in said receptacle; a plurality of electrodes; means for mounting said electrodes to extend substantially horizontally in said sludge zone at horizontally spaced positions therein, said means including means for insulating said electrodes from said receptacle and from each other; and means for sequentially energizing said electrodes to produce sludge-resolving electric fields in said sludge zone adjacent said electrodes and at said spaced positions.

11. A combination as defined in claim 10 in which said sequential energizing means includes a contact member connected to each of said electrodes, and means for applying a potential sequentially to said contact members to energize said electrodes sequentially and establish sludge-resolving electric fields at said spaced positions in said sludge zone.

12. In combination: a grounded receptacle adapted to contain superimposed bodies comprising respectively a body of oil-continuous material and a body of water which has separated from the oil-continuous material, there being a sludge zone just above the separated body of water; means for withdrawing water from said body of water to maintain said sludge zone in substantially fixed position in said receptacle; a plurality of pairs of electrodes at spaced positions in said sludge zone, each pair including two substantially parallel electrodes spaced a small distance from each other; means for insulating one electrode of each pair from the other electrode of the pair whereby a sludge-resolving electric field can be established therebetween when the pair of electrodes is connected to a source of potential; and means for connecting said pairs of electrodes sequentially to such source of potential to establish said sludge-resolving field sequentially at said spaced positions in said sludge zone.

13. In combination: a grounded receptacle adapted to contain superimposed bodies comprising respectively a body of oil-continuous material and a body of water which has separated from the oil-continuous material, there being a sludge zone just above the separated body of water; means for withdrawing water from said body of water to maintain said sludge zone in substantially fixed position in said receptacle; a plurality of spaced rod-like upper electrodes extending substantially horizontally in said sludge zone; a plurality of rod-like lower electrodes extending substantially horizontally in said sludge zone and respectively spaced a small distance below said upper electrodes; means for grounding said lower electrodes to said receptacle; means for insulating said upper electrodes from each other and from said receptacle; and means for sequentially energizing said upper electrodes to produce localized sludge-resolving electric fields at different locations in said sludge zone between the spaced upper and lower electrodes.

14. In an electric treater for emulsions of the water-in-oil type, the combination of: a grounded receptacle; an electrode structure including a pair of spaced emulsion treating electrodes in said receptacle defining a treating space; means for delivering an emulsion to be treated to said treating space; an electric circuit connected to said electrodes for establishing a coalescing electric field in said treating space to coalesce and thereby cause settling of dispersed water of said emulsion; means for maintaining the upper surface of a body of water-continuous material in said receptacle at a substantially fixed level substantially below said electrode structure to define a sludge zone extending above said level to a level below said electrode structure; another electrode positioned in said receptacle below said electrode structure and above said substantially fixed level so as to be positioned in said sludge zone, said other electrode being insulated from said receptacle; and another electric circuit connected to said other electrode and of lower voltage than the first mentioned circuit for establishing a sludge resolving field in said sludge zone in addition to any field extending into said sludge zone from said electrode structure.

CLAUDIUS H. M. ROBERTS.

REFERENCES CITED

The following references are of record in the file of this patent:

UNITED STATES PATENTS

| Number | Name | Date |
|---|---|---|
| 987,115 | Cottrell | Mar. 21, 1911 |
| 1,591,472 | DeBray | July 6, 1926 |
| 1,838,849 | Lawrason | Dec. 29, 1931 |
| 1,838,918 | Eddy | Dec. 29, 1931 |
| 1,838,922 | Fisher | Dec. 29, 1931 |
| 1,873,857 | Worthington | Aug. 23, 1932 |
| 1,947,704 | Fisher | Feb. 20, 1934 |
| 2,001,809 | Worthington | May 21, 1935 |
| 2,033,152 | Roberts | Mar. 10, 1936 |
| 2,182,145 | Eddy | Dec. 5, 1934 |
| 2,083,798 | Roberts | June 15, 1937 |